United States Patent
Kalbavi et al.

(10) Patent No.: US 8,315,736 B2
(45) Date of Patent: Nov. 20, 2012

(54) METHOD AND APPARATUS FOR PICKING/PACKING APPLICATIONS

(75) Inventors: Genesh Kalbavi, Rochester, MI (US); Gordon Geheb, Hartland, MI (US); Min-Ren Jean, Rochester Hills, MI (US); Gerald A. Ross, Rudyard, MI (US); Jason Tsai, Bloomfield Hills, MI (US); Rick Wunderlich, Canton, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 727 days.

(21) Appl. No.: 12/429,771

(22) Filed: Apr. 24, 2009

(65) Prior Publication Data

US 2009/0271034 A1 Oct. 29, 2009

Related U.S. Application Data (60) Provisional application No. 61/048,015, filed on Apr. 25, 2008.

(51) Int. Cl.
*G05B 19/418* (2006.01)
*G05B 19/18* (2006.01)

(52) U.S. Cl. ............ 700/250; 700/248; 700/253; 901/7; 901/8

(58) Field of Classification Search .................. None
See application file for complete search history.

(56) References Cited

U.S. PATENT DOCUMENTS

| | | | | |
|---|---|---|---|---|
| 4,896,087 A * | 1/1990 | Onaga et al. | ................ | 700/249 |
| 5,086,262 A * | 2/1992 | Hariki et al. | ................ | 318/568.1 |
| 5,254,923 A * | 10/1993 | Kanitani | ................ | 318/568.11 |
| 5,771,181 A * | 6/1998 | Moore et al. | ................ | 703/7 |
| 5,825,981 A * | 10/1998 | Matsuda | ................ | 700/248 |
| 6,618,856 B2 * | 9/2003 | Coburn et al. | ................ | 717/135 |
| 8,014,899 B2 * | 9/2011 | Ban et al. | ................ | 700/248 |

* cited by examiner

*Primary Examiner* — Khoi Tran
*Assistant Examiner* — Bao Long T Nguyen
(74) *Attorney, Agent, or Firm* — Fraser Clemens Martin & Miller LLC; William J. Clemens (57) ABSTRACT

A system for picking and packing applications is provided. The system includes a plurality of robots and a plurality of robot controllers. Each robot controller includes a load rebalance subsystem, a load balance subsystem, a robot state change detector subsystem, a communicator subsystem, and a motion control subsystem. Each of the robot controllers is interconnected and in communication with one another via the communicator subsystems. Each of the robots has a workload that may be selectively balanced. A method for balancing the workloads of the robots using built-in processors which run motion control is also provided.

18 Claims, 2 Drawing Sheets

METHOD AND APPARATUS FOR PICKING/PACKING APPLICATIONS

CROSS REFERENCE TO RELATED APPLICATION

This application claims the benefit of U.S. Provisional Application Ser. No. 61/048,015, filed on Apr. 25, 2008. The entire disclosure of the above application is hereby incorporated herein by reference.

FIELD OF THE INVENTION

The present invention relates to pick and place robot systems that have multiple robots working on at least one conveyer, and related methods.

BACKGROUND OF THE INVENTION

For pick and place robot systems that have multiple robots working on a conveyer, a common reference frame has to be established on the conveyer. Then a track frame has to be taught or created on each robot that transforms the robot's world coordinate to the common reference frame on the conveyer. If the track frame is not set up accurately, the robot cannot locate and pick up parts that come down on the conveyer.

There is a continuing need for an improved system and method for robotic picking/packing applications, particularly in cooperation with at least one conveyor.

SUMMARY OF THE INVENTION

In concordance with the instant disclosure, an improved system and method for robotic picking/packing applications, particularly in cooperation with at least one conveyor, is surprisingly found.

A system for picking/packing applications includes a plurality of robots and a plurality of robot controllers. Each robot controller has a load re-balance subsystem, a load balance subsystem, a robot state change detector subsystem, a communicator subsystem, and a motion control subsystem. Each of the robot controllers is interconnected and in communication with one another via the communicator subsystems. Each of the robots has an associated workload.

In a first embodiment, a method for balancing the load of multiple robots using standard built-in processors which run motion control includes the steps of: providing a system including a plurality of robots and a plurality of robot controllers, each of the robot controllers having a load re-balance subsystem, a load balance subsystem, a robot state change detector subsystem, a communicator subsystem, each of the robot controllers interconnected and in communication with one another via the communicator subsystems, and a motion control subsystem, each robot further having a workload; monitoring the state of the robots with at least one of the robot state change detector subsystems; communicating a change in state of one of the robots from at least one of the robot state change detector subsystems to at least one of the load re-balance subsystems when the change in state of one of the robots is detected; recomputing the workloads of the robots on the load re-balance subsystem to adjust for the change in state of one of the robots; and communicating the recomputed workloads from the load re-balance subsystem to the load balance subsystems of each robot controller, each of the load balance subsystems executing the recomputed workloads on each of the robots.

In another embodiment, a method for automatically migrating an active load re-balance subsystem in a distributed processor network during a change in state of a robot in the system includes the steps of: providing a system including a plurality of robots and a plurality of robot controllers, each of the robot controllers having a load re-balance subsystem, the load re-balance subsystem active on only one of the robot controllers, a load balance subsystem, a robot state change detector subsystem, a communicator subsystem, each of the robot controllers interconnected and in communication with one another via the communicator subsystems, and a motion control subsystem, each robot further having a workload; monitoring the state of the robots with at least one of the robot state change detector subsystems; communicating a change in state of the robot with the active load re-balance subsystem from at least one of the robot state change detector subsystems to at least one of the load re-balance subsystems when the change in state of the robot with the active load re-balance sub-system is detected; and causing the active load re-balance subsystem to migrate from one of the robot controllers to another of the robot controllers when the robot having the robot controller with the active load re-balance system has the change in state.

In a further embodiment, a method for simulating the process throughput on actual robots without actual conveyors and sensors include the steps of: providing a system including a plurality of robots and a plurality of robot controllers, each of the robot controllers having a load re-balance subsystem, the load re-balance subsystem active on only one of the robot controllers, a load balance subsystem, a robot state change detector subsystem, a communicator subsystem, each of the robot controllers interconnected and in communication with one another via the communicator subsystems, and a motion control subsystem, each robot further having a workload, the system further including at least one simulated sensor and/or at least one simulated encoder; and utilizing inputs from the simulated sensors and/or the simulated encoders to operate the robots.

In an additional embodiment, a method for moving conveyor encoder synchronization includes the steps of: providing a system including a plurality of robots, a plurality of robot controllers, and a conveyor, each robot controller having a load re-balance subsystem, the load re-balance subsystem active on only one of the robot controllers, a load balance subsystem, a robot state change detector subsystem, a communicator subsystem, each of the robot controllers interconnected and in communication with one another via the communicator subsystems, and a motion control subsystem, each robot further having a workload; monitoring the state of the robots with at least one of the robot state change detector subsystems; communicating from the robot controller of the robot having had a change in state to the other robot controllers that the robot having had the change in state is ready to return to an original state; communicating an encoder value with global time for each of the other robots from each of the other robot controllers to the robot controller of the robot ready to return to the original state; comparing the encoder value with global time for each of the other robots to an encoder value with global time for the robot ready to return to the original state; and synchronizing the encoder count with global time for the robot ready to return to the original state with the encoder value with global time for each of the robots, whereby the robot ready to return to the original state may return to the original state without interrupting the operation of the other robots.

In a different embodiment, a method for dynamic load distribution by controlling the process equipment includes the steps of: providing a system including a plurality of robots and a plurality of robot controllers, each of the robot controllers having a load re-balance subsystem, the load re-balance subsystem active on only one of the robot controllers, a load balance subsystem, a robot state change detector subsystem, a communicator subsystem, each of the robot controllers interconnected and in communication with one another via the communicator subsystems, and a motion control subsystem, each robot further having a workload, the system further including a setup processor remote from and selectively connected to at least one of the robot controllers; and allowing a user to at least one of download and upload information to the selected robot controller with the setup processor.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
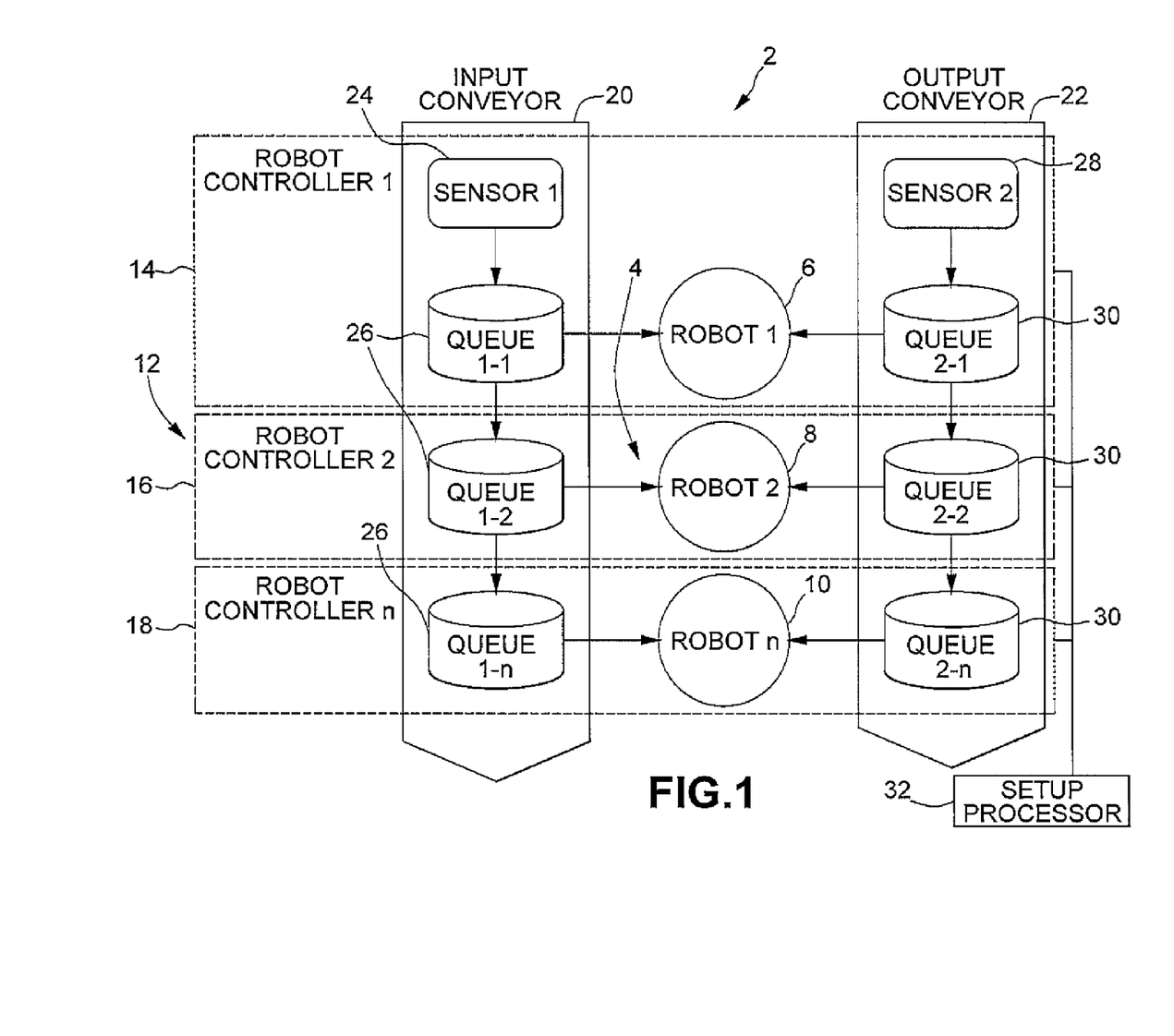
FIG. 1 is a schematic diagram illustrating an exemplary robot system for use with the methods according to the present disclosure.

As shown in FIG. 1, the present disclosure includes a system 2 including a plurality of robots 4, such as industrial robots for picking/packing applications. For example, the plurality of robots 4 may include a first robot 6, a second robot 8, and a third robot 10. The system 2 also includes a plurality of robot controllers 12. For example, the first robot 6 has an associated first robot controller 14, the second robot 8 has an associated second robot controller 16, and the third robot 10 has an associated third robot controller 18. As further shown in FIGS. 2 and 3, each of the robot controllers 12 includes a load re-balance subsystem A, a load balance subsystem B, a robot state change detector subsystem C, a communicator subsystem D, and a motion control subsystem E. Each of the robot controllers 12 is interconnected and in communication with one another via the communicator subsystem D. The system 2 may further include at least one of an actual sensor AS, a simulator sensor SS, an actual encoder AE, and a simulated encoder SE, as desired.

It should be understood that at least one of the robot controllers 12 may support one or more robots 4, as desired. For example, one of the robot controllers 12 may include at least two motion control subsystems E, shown as $E_{1-n}$ in FIG. 2.

As a nonlimiting example, at least one of the robots 4 may be located next to at least one conveyor 20, 22, and have an associated workload. The at least one conveyor 20, 22 may include an input conveyor 20 and an output conveyor 22. At least one of the robots 4 may be disposed between the input conveyor 20 and the output conveyor 22. As a nonlimiting example, the robot state change detector subsystem C, which resides on each robot controller 12, may cause the motion control subsystem E to operate the robots 4 so that the robots 4 pick and place parts from the input conveyor 20 to the output conveyor 22. The robot state change detector subsystem C is configured to detect an operation of the robots 4, as well as faulted states, e.g., where one of the robots 4 begins to experience a change in performance or is decidedly removed from the system 2, and communicates the operational status of the robots 4 to the load re-balance subsystem A.

In a particular embodiment, parts (not shown) are placed on the input conveyor 20 for picking by the robots 4. Input part data, such as at least one of an orientation and a position of the parts on the input conveyor 20, is detected by a first sensor 24. The first sensor 24 may be a camera or other optical or proximity sensor, for example. The input part data is stored in a first queue 26 (shown as queues 1-1, 1-2, and 1-$n$, for example). The first queue 26 is managed by the load balancing subsystem B. The system 2 may also include a second sensor 28 at the output conveyor 22 for collecting output part data, such as at least one of an orientation and a position of a tray or output container on which the parts are to be placed, for example. The output part data is stored in a second queue 30 (shown as queues 2-1, 2-2, and 2-$n$, for example). It should be understood that the robot controllers 12 may include more than one queue 26, 30, for example, multiple input queues 26 and multiple output queues 30. In the case of one of the robot controllers 12 supporting multiple robots 4, for every robot 4 there may be multiple input queues 26 and multiple output queues 30, as desired. One of ordinary skill in the art should appreciate that other robot controller 12 configurations may also be employed within the scope of the present disclosure.

The pick and drop sequence of the first robot 6 is controlled by the motion control subsystem E residing on the first robot controller 14. The first robot 6 reads the part data from the first queue 26 via the load balance subsystem B. The load balance subsystem B then may allocate parts based on predetermined load balance criteria, when requested by the motion control subsystem E. For example, the load balance criteria may be specified in a user interface subsystem (not shown). All of the parts that are picked by the first robot 6 are deleted from the first queue 26. The part data for all of the parts that are not picked by the first robot 6 is transferred to the first queue 26 on the second robot controller 16. The second robot 8 then reads the first queue 26 using the load balance subsystem B.

Following the picking of parts by the second robot 8, the load balancing subsystem B sends part data for all of the parts that are not picked by the first robot 6 and the second robot 8 to the first queue 26 of the third robot 10. The first queue 26 is read by the third robot 10 using the load balance subsystem B.

It should be appreciated that the operation of the system 2 described herein with respect to the first queue 26 and the input conveyor 20 may likewise be employed with respect to the second queue 30 and the output conveyor 22.

The workload of robots 4 in the present system 2 may be balanced using the built-in processors which run motion control. For example, when one of the robots 4 changes state, such as when one of the robots 4 goes into a faulted state, the robot state change detector subsystem C communicates with the load re-balance subsystem A. It should be understood that, any time the subsystems A, B, C, E that reside on the different robot controllers 12 are required to communicate, the subsystems A, B, C, E utilize the communicator subsystems D.

As a nonlimiting example, the communicator subsystem D is an interprocessor communicator, such as an Ethernet network or the like. Other suitable communication systems may also be employed, as desired.

Following the communication concerning the change of state of one of the robots 4 to the load re-balance subsystem A, the load re-balance subsystem A sets new load balance criteria for the load balance subsystem B in each of the robot controllers 12. In a particularly illustrative embodiment, the load re-balance subsystem A resides actively in only one robot controller 12 of the system 2, referred to as the "master" robot controller 12.

The system 2 permits multiple robots 4 to re-balance their respective workloads using the same microprocessors that also control the motion of the robots 4. In an illustrative embodiment, a method for balancing the workload on the robots 4 includes the steps of: monitoring the state of the robots 4 with at least one of the robot state change detector subsystems C; communicating a change in state of one of the robots 4 from at least one of the robot state change detector subsystems C to at least one of the load re-balance subsystems A when the change in state of one of the robots 4 is detected; recomputing the workloads of the robots 4 on the load re-balance subsystem A to adjust for the change in state of one of the robots 4; and communicating the recomputed workloads from the load re-balance subsystem A to the load balance subsystems B of each robot controller 12, each of the load balance subsystems B executing the recomputed workloads on each of the robots 4.

One of ordinary skill should appreciate that the method does not require any microprocessors external to the robot controllers 12, such as personal computers and the like. The system 2 and method may coordinate the load balancing system via connections such as Ethernet connections between the standard on-board microprocessors in all of the robot controllers 12 in the system 2. In a particular embodiment, only the native on-board processors that are typically provided with the robot controllers 12 are used for both motion control and load re-balancing in the system 2.

The present disclosure further includes a method to automatically migrate the load re-balance subsystem A in the distributed processor system 2 during a change of the system 2 performance. For example, where there are multiple robot controllers 12 in the system 2, and the load re-balance subsystem A operates actively on only one of the robot controllers 12, and the robot controller 12 on which the load re-balance subsystem A is running is degrading, the system 2 may automatically migrate the active load re-balance subsystem A to another robot controller 12 in the system that is in a "safe" or normally operating state. Desirably, the new robot controller 12 to which the load re-balance subsystem A is migrated also runs motions control. After a repair or replacement of the robot 4 with the degraded load re-balance subsystem A, for example, the active load re-balance subsystem A may be migrated back to the robot 4 when the robot 4 is brought back on-line.

In one embodiment, the method employs subsystems A, B and C and D. The method may include the steps of monitoring the state of the robots 4 with at least one of the robot state change detector subsystems C; communicating a change in state of the robot 4 with the active load re-balance sub-system A from at least one of the robot state change detector subsystems C to at least one of the load re-balance subsystems A when the change in state of the robot 4 with active load re-balance sub-system A is detected; and causing the active load re-balance subsystem A to migrate from one of the robot controllers 12 to another of the robot controllers 12 when the robot 4 having the robot controller 12 with the active load re-balance system A has the change in state.

The robot controller 12 to which the active load re-balance system A migrates may depend on a predetermined indexing system. For example, the robot controllers 12 may be ranked, and the active load re-balance system A caused to migrate from the faulty robot controller 12 to a next ranking robot controller 12 in the predetermined indexing system. The active load re-balance system A may be caused to migrate to the next lowest or the next highest ranking, for example. Other indexing means may also be employed, as desired. In a particular example, the active load re-balance subsystem A always runs on the next ranking alive robot controller 12. The robot state change detector subsystem C may also run on the other robot controllers 12 at all times, for example, to check whether the preceding ranking alive robot controller 12 is alive or dead. Other means for selecting which robot controller 12 to migrate the active load re-balance system A to may be employed, as desired.

Where the robot state change detector subsystem C is employed to detect the change in states of the robots 4, the robot state change detector subsystem C may detect whether any of the robot controllers 12 in the system is alive or dead at a very high frequency rate. As a nonlimiting example, the frequency rate may be less than about 100 milliseconds, particularly less than about 10 milliseconds, and most particularly less than about 1 millisecond. The robot state change detector subsystem C may constantly update the state of all of the robot controllers 12 in all the robot controllers 12 on which the robot state change detector subsystem C resides, for example, by communication through the communicator subsystem D.

In certain alternative embodiments, the system 2 may further include a data management subsystem (not shown) that keeps data in all the robot controllers 12 synchronized at all times. When the load re-balance subsystem A in, for example, the next higher-ranking or the next lower-ranking, alive robot controller 12 observes the change of state of another robot controller 12, the load re-balance subsystem A on the next higher-ranking alive robot controller 12 immediately is caused to become active. Where the data management subsystem has kept all data synchronized in all of the robot controllers 12, the newly selected load re-balance subsystem A can continue from where the previous load re-balance subsystem A left off. It should be appreciated that the data management subsystem function can also be performed by the robot state change detector subsystem C, as desired.

It should be appreciated that the method to automatically migrate the load re-balance subsystem A in the distributed processor system 2 assures that as long as there is one alive robot controller 12 in the system 2, then the load re-balance subsystem A remains functioning.

Figure 3:
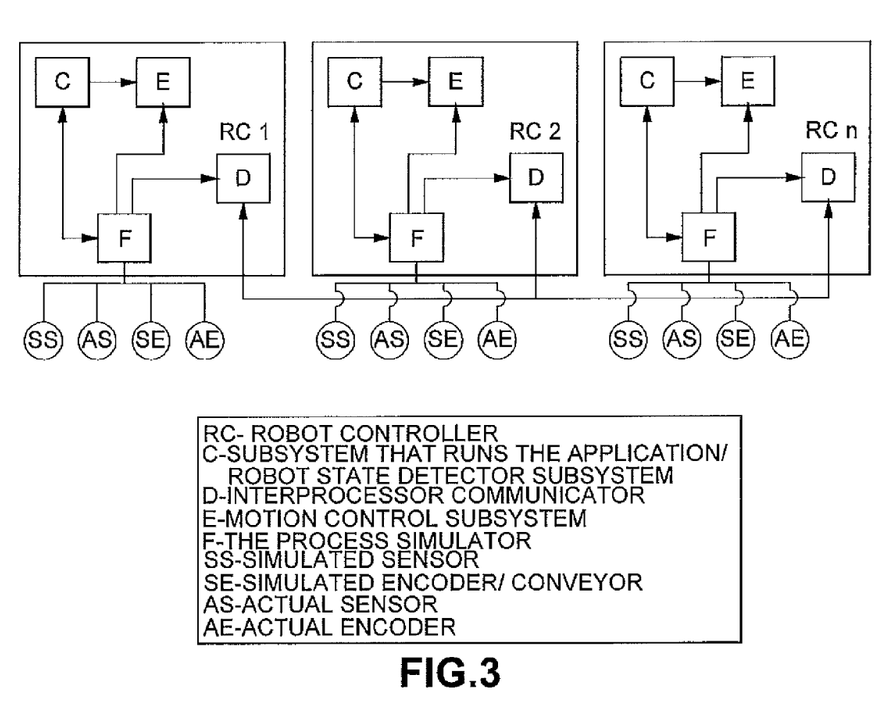
FIG. 3 is a schematic diagram illustrating robot controller subsystems according to another embodiment of the present disclosure.

Referring now to FIG. 3, the present disclosure further includes a method for simulating the process throughput the system 2 on actual robots 4 without the actual conveyors 20, 22 and the actual sensors AS. The method enables one or more of the robots 4 to simulate an application that contains one or more of the conveyors 20, 22 and one or more actual sensors AS. The robots 4 in the application may perform the respective pick and place tasks without the physical conveyors 20, 22 and actual sensors AS, for example. The simulation may be performed with the actual robots 4, however. This allows a user to test the operation of the system throughput and duty of the robots 4 without having to operate the actual conveyors 20, 22 and the actual sensors AS.

In a particular embodiment, the method includes the step of utilizing inputs from at least one of the simulated sensors SS and the simulated encoders SE to operate the robots 4. When the system 2 is operated, the robot state change detector subsystem C may also include a subsystem that runs the simulation application. The robot state change detector subsystem C on each robot controller 12 may be permitted to operate the motion control subsystem E of each robot 4. If the simulation requirement is input, then the robot state change detector subsystem C runs a process simulator F which has the knowledge to simulate encoders and sensors at appropriate, predefined rates. The motion control subsystem E runs by utilizing the inputs from at least one of the simulated encoders SE and/or the simulated sensors SS.

It is possible to flexibly configure the running of the motion control subsystem E to simulate sensors only and simulate both sensors and encoders. All or no sensors can be simulated, as desired. All or no encoders can also be simulated, as desired.

As a nonlimiting example, the system 2 may employ an object model that includes the conveyors 20, 22 as a simulated object and the simulated sensors SS. While running the entire application with the actual robots 4, the system 2 may be permitted to performs its tasks on the sensors and the encoders regardless of whether they are actual sensors AS or simulated sensors SS, or actual encoders AE or simulated encoders SE. The simulated sensors SS have the capability to simulate their outputs similar to the actual sensors AS. The simulated encoders SE can be run at the same rate as the actual encoders AE.

The system 2 may perform all of the coordination of simulating the sensors SS, running the simulated encoders SE and motion control of the robots 4 based on a desired process throughput which is provided as input to the system 2. Advantageously, the entire simulation of process throughput may be performed with only the built-in, on-board microprocessors in the robot controllers 12 that also perform motion control. It should be understood that no external or additional processors are required.

Figure 2:
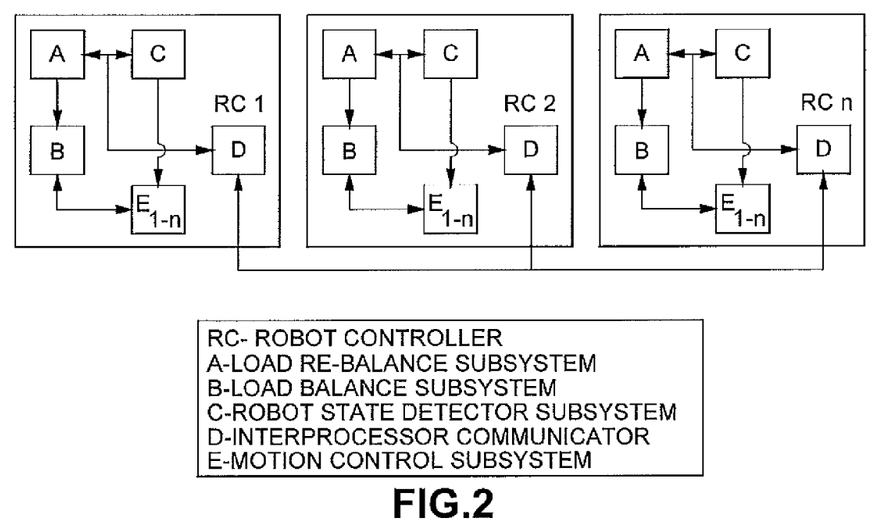
FIG. 2 is a schematic diagram illustrating robot controller subsystems according to one embodiment of the present disclosure.

With renewed reference to FIGS. 1 and 2, the present disclosure further includes a method for moving conveyor encoder synchronization. For example, the method synchronizes the encoder values of the robot controller 12 that is going off-line with other robot controllers 12 that also are using the same conveyor 20, 22. This permits each robot controller 12 to reference correctly to the same parts of the conveyor 20, 22.

The method includes the steps of monitoring the state of the robots 4 with at least one of the robot state change detector subsystems C; communicating from the robot controller 12 of the robot 4 having had a change in state to the other robot controllers 12 that the robot 4 having had the change in state is ready to return to an original state, for example, an operational state; communicating an encoder value with global time for each of the other robots 4 from each of the other robot controllers 12 to the robot controller 12 of the robot 4 ready to return to the original state; comparing the encoder value with global time for each of the other robots 4 to an encoder value with global time for the robot 4 ready to return to the original state; and synchronizing the encoder count with global time for the robot 4 ready to return to the original state with the encoder value with global time for each of the robots 4. The robot 4 ready to return to the original state may thereby be returned to the original state without interrupting the operation of the other robots 4 in the system 2.

As used herein, the term "global time" means a standardized time shared by all of the robot controllers 12 in the system 2. For example, each robot controller 12 may keep track of a controller-specific internal time or tick count. During operation of the system, the master robot controller 12 may send its internal time information to the slave robot controllers 12. A difference between the master internal time and the internal time of each of the slave robot controllers 12 may be calculated and stored on each of the slave robot controllers 12. The global time may be shared by each of the robot controllers 12 by adding the internal time and the stored difference. The global time may also be updated on a regular basis by having the master robot controller 12 resend its internal time information to the slave robot controllers 12, and repeating the calculation and storage of the difference. Other means for providing the global time on the system 2 may be employed, as desired.

It should be understood that, when the robot controller 12 uses incremental encoder power up while the conveyor 20, 22 is moving, the encoder count will change continuously. However, the encoder count for the robot controller 12 that is in a faulty state will be different than the other robot controllers 12 in the system 2. The load re-balance subsystem A may also perform the conveyor encoder synchronization in all of the robot controllers 12 when any of the robots controllers 12 power up, for example, during a startup of the system 2. The load re-balance subsystem A may employ the communicator subsystems D for sending and obtaining encoder data from the other robot controllers 12.

The robot controllers 12 in the system may communicate with one another via an Ethernet connection, for example. The robot controller 12 of the robot 4 ready to return to the original state may send or transmit packets over the communications subsystem D to request encoder counts from each other robot controller 12 on the same conveyor 20, 22. The other robot controllers 12 may return the encoder value with global time. When the robot controller 12 of the robot 4 ready to return to the original state receives the encoder count and global time for the other robot controllers 12, the robot controller 12 of the robot 4 ready to return to the original state may then compare the encoder counter of the other robot controllers 12 with its encoder counts at the same global time that it records in a buffer. The difference of encoder count may thereby be used to synchronize the encoder count of the robot controller 12 ready to return to the original state with the other robot controllers 12 in the system 2.

The present disclosure further includes a single point method of setup and transfer of information between a setup processor 32 and the motion control subsystems E of the robot controllers 12, utilizing an open common format. Typical high-speed robotic picking applications involve more than one motion control processor, each requiring setup. To militate against setup errors, the setup processor 32 provides a single point setup of the motion control subsystems E and is designed to work in either a connected and/or disconnected environment by producing and consuming setup information in an open common format. Advantageously, the setup processor 32 may be disconnected when running production with the system 2. The setup processor 32 may include a personal computer or a teaching pendant having a graphical interface. For example, the graphical interface may allow a user to drag and drop objects, gather information, and send information to the robot controllers 12, as desired.

When connected, the setup processor 32 provides the single point of setup by exchanging all setup information with only one motion control subsystem E designated as the "configuration controller", which the user must define. Because the configuration controller can change, the setup processor 32 authenticates the configuration controller prior to every online exchange to ensure the information will be propagated to the other motion control subsystems E in the system 2.

After the user sets up the system 2, the user may disconnect the setup processor 32 from the production environment. Illustratively, the system 2 is designed to operate with or without the setup processor 32.

When disconnected, the setup processor 32 can also operate by allowing the user to create a work cell, or by importing setup information from a configuration controller backup. After the user makes the appropriate changes to the setup information, the user can export the setup information to an intermediate storage medium, for example, for uploading to the configuration processor.

The exchange of setup information between the setup processor 32 and the configuration controller is in an open common format allowing the user to view, modify and perform whatever other operations the user deems relevant. There are no restrictions on the user making unique setup information files. The main requirements imposed by both the setup processor 32 and the configuration controller are that the data maintain a designed structure and a correct referential integrity.

It is surprisingly found that the system 2 and methods of the present disclosure facilitate picking/packing applications with greater efficiency and less downtime due to faulty or degraded performance robots 4, particularly in cooperation with the at least one conveyor 20, 22.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method comprising the steps of:
   providing a system including a plurality of robots and a plurality of robot controllers, each of the robot controllers having a load, re-balance subsystem, a load balance subsystem, a robot state change detector subsystem, a communicator subsystem, each of the robot controllers interconnected and in communication with one another via the communicator subsystems, and a motion control subsystem, each of the robots further having a workload;
   monitoring the state of the robots with at least one of the robot state change detector subsystems;
   communicating a change in state of one of the robots from at least one of the robot state change detector subsystems to at least one of the load re-balance subsystems when the change in state of one of the robots is detected;
   recomputing the workloads of the robots on one of the load re-balance subsystems to adjust for the change in state of one of the robots;
   communicating the recomputed workloads from the load re-balance subsystem to the load balance subsystems of each robot controller, each of the load balance subsystems executing the recomputed workloads on each of the robots;
   wherein the system further includes a conveyor, the method further comprising the steps of:
      communicating from the robot controller of the robot having had the change in state to the other robot controllers that the robot having had the change in state is ready to return to an original state;
      communicating an encoder value with global time for each of the other robots from each of the other robot controllers to the robot controller of the robot ready to return to the original state;
      comparing the encoder value with global time for each of the other robots to an encoder value with global time for the robot ready to return to the original state; and
      synchronizing the encoder count with global time for the robot ready to return to the original state with the encoder value with global time for each of the robots, whereby the robot ready to return to the original state may return to the original state without interrupting the operation of the other robots.

2. A method comprising the steps of:
   providing a system including a plurality of robots, a plurality of robot controllers, and a conveyor, each of the robot controllers having a load re-balance subsystem, the load re-balance subsystem active on only one of the robot controllers, a load balance subsystem, a robot state change detector subsystem, a communicator subsystem, each of the robot controllers interconnected and in communication with one another via the communicator subsystems, and a motion control subsystem, each of the robots further having a workload;
   monitoring the state of the robots with at least one of the robot state change detector subsystems;
   communicating from the robot controller of the robot having had a change in state to the other robot controllers that the robot having had the change in state is ready to return to an original state;
   communicating an encoder value with global time for each of the other robots from each of the other robot controllers to the robot controller of the robot ready to return to the original state;
   comparing the encoder value with global time for each of the other robots to an encoder value with global time for the robot ready to return to the original state; and
   synchronizing the encoder count with global time for the robot ready to return to the original state with the encoder value with global time for each of the robots, whereby the robot ready to return to the original state may return to the original state without interrupting the operation of the other robots.

3. A robot system for picking and placing parts comprising:
   a plurality of robots each having an associated workload involving picking and placing selected ones of the parts;
   a plurality of robot controllers, each of the robots being connected to one of the robot controllers for operating the robots in accordance with the associated workloads;
   each of the robot controllers having a load re-balance subsystem, a load balance subsystem, a robot state change detector subsystem, a communicator subsystem, and a motion control subsystem, the subsystems being in communication within the robot controller and the robot controllers being interconnected and in communication via the communicator subsystems; and
   whereby when the robot state change detector subsystem of one of the robot controllers detects a change in state of one of the robots connected thereto, the one robot controller robot state change detector subsystem communicates the change in state to the load re-balance subsystem of the one robot controller, the one robot controller load re-balance subsystem responds to the change in state by recomputing workloads for all of the robots, the recomputing occurring on the one robot controller, and the one robot controller communicates the recomputed workloads from the one robot controller load re-balance subsystem to the load balance subsystems of all of the robot controllers.

4. The system according to claim 3, further including at least one conveyor located next to at least one of the robots and upon which the parts are placed or from which the parts are picked.

5. The system according to claim 3, further including at least one of a sensor, an encoder, a simulated sensor, and a simulated encoder connected to the one robot controller for generating an input signal.

6. The system according to claim 3, further including a setup processor remote from and selectively connected to at least one of the robot controllers.

7. A method for picking and placing parts comprising the steps of:
provided a system including a plurality of robots connected with a plurality of robot controllers for operating the robots, each of the robot controllers having a load re-balance subsystem, a load balance subsystem, a robot state change detector subsystem, a communicator subsystem, and a motion control subsystem, the subsystems being in communication within the robot controller and the robot controllers being interconnected and in communication via the communicator subsystems, each of the robots further having an associated workload involving picking and placing selected ones of the parts;
monitoring the state of the robots with at least one of the robot state change detector subsystems;
communicating a change in state of one of the robots from the at least one robot state change detector subsystem to at least one of the load re-balance subsystems when the change in state of the one robot is detected;
recomputing the workloads of the robots with the at least one load re-balance subsystem to adjust for the change in state of the one robot, the recomputing occurring on the robot controller of the one robot; and
communicating the recomputed workloads from the at least one load re-balance subsystem to the load balance subsystem of each of the robot controllers, each of the load balance subsystems executing the recomputed workloads on the robots.

8. The method according to claim 7, wherein the one load re-balance subsystem does not exist on a personal computer.

9. The method according to claim 7, wherein the one load re-balance subsystem is caused to migrate from one of the robot controllers to another of the robot controllers when the robot connected to the robot controller with the one load re-balance system has the change in state.

10. The method according to claim 7, wherein the system further includes at least one sensor being an actual sensor or a simulated sensor and at least one encoder being an actual encoder or a simulated encoder, the method further including the step of utilizing inputs from the at least one sensor and the at least one encoder to operate the robots.

11. The method according to claim 10, wherein at least one of the robot controllers includes a process simulator that processes the inputs from the at least one sensor and the at least one encoder.

12. The method according to claim 10, wherein the step of utilizing inputs does not occur on a personal computer.

13. The method according to claim 7, wherein the system further includes a conveyor, the method further comprising the steps of: communicating from the one robot controller of the one robot having had the change in state to the other robot controllers that the one robot having had the change in state is ready to return to an original state; communicating an encoder value with global time for each of the other robots from each of the other robot controllers to the one robot controller of the one robot ready to return to the original state; comparing the encoder value with global time for each of the other robots to an encoder value with global time for the one robot ready to return to the original state; and synchronizing the encoder count with global time for the one robot ready to return to the original state with the encoder value with global time for each of the robots, whereby the one robot ready to return to the original state may return to the original state without interrupting the operation of the other robots.

14. The method according to claim 7, wherein the system further includes a setup processor remote from and selectively connected at least one of the robot controllers, the setup processor providing a single point of setup, the method further comprising the step of allowing a user to at least one of download and upload information to the motion control subsystem of the at least one robot controller with the setup processor.

15. A method for picking and placing parts comprising the steps of:
providing a system including a plurality of robot controllers each being connected to at least one robot of a plurality of robots, each of the robot controllers having a load re-balance subsystem, the load re-balance subsystem active on only one of the robot controllers, a load balance subsystem, a robot state change detector subsystem, a communicator subsystem, and a motion control subsystem, the subsystems being in communication within the robot controller and the robot controllers being interconnected and in communication via the communicator subsystems, each of the robots further having an associated workload involving picking and placing selected ones of the parts;
monitoring the state of the robots with at least one of the robot state change detector subsystems;
communicating a change in state of one of the robots from at least one of the robot state change detector subsystems to at least one of the load re-balance subsystems when the change in state of the one robot is detected; and
causing the active load re-balance subsystem to migrate from the one robot controller to another of the robot controllers when the robot having the robot controller with the active load re-balance system has the change in state, a recomputing of workloads of the robots occurring on the another of the robot controllers to which the active load re-balance subsystem migrates.

16. A method for picking and placing parts comprising the steps of:
providing a system including a plurality of robot controllers each connected to one of a plurality of robots, each of the robot controllers having a load re-balance subsystem, the load re-balance subsystem active on only one of the robot controllers a load balance subsystem, a robot state change detector subsystem, a communicator subsystem, and a motion control subsystem, the subsystems being in communication within the robot controller and the robot controllers being interconnected and in communication via the communicator subsystems, each of the robots further having an associated workload involving picking and placing selected ones of the parts, the system further including at least one sensor being an actual sensor or a simulated sensor and at least one encoder being an actual encoder or a simulated encoder, a recomputing of the workloads for the robots occurring on the robot controller having the active load re-balance subsystem; and utilizing inputs from the at least one sensor and the at least one encoder to operate the robots.

17. The method according to claim 16, wherein the robot controller includes a process simulator that processes the inputs from the at least one sensor and the at least one encoder.

18. The method according to claim 16, wherein the step of utilizing the inputs does not occur on a personal computer.

* * * * *

UNITED STATES PATENT AND TRADEMARK OFFICE
CERTIFICATE OF CORRECTION

PATENT NO. : 8,315,736 B2
APPLICATION NO. : 12/429771
DATED : November 20, 2012
INVENTOR(S) : Ganesh Kalbavi et al.

It is certified that error appears in the above-identified patent and that said Letters Patent is hereby corrected as shown below:

On the Title Page

Item 75, Inventors:
Correct "Genesh Kalbavi" to "Ganesh Kalbavi"

Signed and Sealed this
Seventeenth Day of September, 2013

Teresa Stanek Rea
*Deputy Director of the United States Patent and Trademark Office*